United States Patent Office 3,490,914
Patented Jan. 20, 1970

3,490,914
PREPARATION OF VEGETABLE PROTEIN-
CONTAINING FOOD PRODUCTS
George K. Okumura, 3151 S. Elm Ave. 93706, and
Jack E. Wilkinson, 2411 Divisadero St. 93721, both
of Fresno, Calif.
No Drawing. Continuation-in-part of applications Ser.
No. 445,695, Apr. 5, 1965, and Ser. No. 638,573, May
15, 1967. This application Oct. 23, 1967, Ser. No.
677,046
Int. Cl. A23c 11/00; A23j 1/14
U.S. Cl. 99—64                    10 Claims

ABSTRACT OF THE DISCLOSURE

Water-soluble protein is extracted by precipitation from de-fatted slurry of soy bean or other protein-containing vegetable material, and is then converted by a freezing step into a fibrous, sprponge-like protein mass lacking the taste of soy or other starting material, which mass can then be further processed into a meat-like solid food or into a milk, or derivative of milk such as cheese, icecream, yogurt, etc., additional steps of finely comminuting the fibrous mass and adding water and other additives being utilized in producing the milk.

RELATED APPLICATIONS

This application is a continuation-in-part of our application Ser. No. 445,695, filed Apr. 5, 1965, for Process of Producing Soy Milk from Sprouted Soy Beans, now Patent No. 3,399,997 and of our abandoned application Ser. No. 638,573, filed May 15, 1967, for Processing of Soy Food Products with Freeze Treatment.

BACKGROUND OF INVENTION

Production of a vegetable milk by extraction from a slurry of ground soy beans, has been practiced heretofore, although with less than fully satisfactory results from efforts to eliminate the characteristic soy bean taste, which is essentially unpalatable to humans, especially in soy milk.

A method of spinnerette processing of edible fiber material, suitable for consumption as a vegetable substitute for meat, with a simulation of the meat fiber structure of meat, is disclosed in Boyer Patent No. 2,682,466, issued June 29, 1954. The process has been commercially practiced and the product marketed for a number of years. It has proven to be quite expensive in production, however, and the product is correspondingly high-priced. Hence a need for a simpler and less expensive method for production of a fibrous soy-bean food product suitable for processing into a meat substitute, has continued to exist.

SUMMARY OF INVENTION

The present invention is particularly characterized in that a defatted concentrate of vegetable proteins from seeds or other vegetable components such as soy bean, sesame, cotton seed, alfalfa or other protein-containing green plants is first prepared by precipitation from a slurry of ground solids of soy bean or other vegetable material, and a suspension of the precipitate in water is then prepared and subjected to a freezing step in which the residual trace of unpalatable (e.g. soy) taste is removed from the protein content which is resolved into a spongy mass from which meat-like solids can be prepared, or milk (e.g., soy) can be derived by subsequently disintegrating (reducing) the sponge structure of the intermediate product to a finely-divided state, and then reconstituting the disintegrated material into a suspension which is homogenized and treated with additives to produce an improved vegetable base milk.

A specific object of the invention is to provide an improved method of processing soy or equivalent vegetable milk of improved palatabiliy.

A more general object is to provide an improved method, less expensive than prior methods, of producing vegetable-base edible fibrous food products, freed of unpalatable (e.g. soy) flavor, and which may be made to resemble meat in texture and taste.

A further and important object is to provide a method whereby a very substantial increase in protein content is attained in the product of the process.

Another object is to provide an improved soy bean derivative vegetable milk of exceptionally high protein content and improved flavor, lacking the characteristic soy taste.

A still further object is to provide a meat-like vegetable-derivative solid product having these improved characteristics.

DESCRIPTION

In the first stage of our process, a slurry of ground, dehulled, defatted soy bean or protein-containing vegetable material is prepared, using one of several alternative methods. A preferred method is to utilize soy bean flake, a fairly inexpensive by-product from the production of soy bean oil by extraction of the oil from soy beans. Another method, in this stage, is that set forth in our above identified application Ser. No. 445,695. Water-soluble protein is then extracted from the slurry by precipitation and straining off the slurry liquor. Much of the unpalatable (e.g. soy) taste is removed from the extracted protein in this first stage of processing. A suspension of the extrocted protein is then prepared by adding water, and this suspension is subjected to a freezing step in which the water is converted into fine, needle-like ice crystals and the protein is converted from a smooth, gelatinous structure into a fibrous sponge structure which retains its sponge character after the ice crystals have been melted and the resulting water largely removed, by draining and pressing, to leave a fibrous solid residue of exceptionally high protein content from which residual traces of the unpalatable taste have been removed by the freezing step. In this residue, the invention has increased the content of the milk, as measured on the 5.79 nitrogen scale, to 4% protein over the approximately 2% protein content of soy milk hitherto available on the market. The nitrogen scale referred to is defined by the formula N×5.79=percent protein, where N represents the percentage by weight, of free nitrogen recovered from a test sample of the milk which has been reduced by destructive distillation. This quantity, multiplied by the factor 5.79 would then give the percentage of protein.

A more detailed description of the process in its several modified forms is given in the following examples.

EXAMPLE I

Preferred method (1) Bean flake, the defatted residue of soy bean material from which soy oil has been extracted, is soaked in a vat of water at room temperature a few minutes to soften it and moisten it with substantially the maximum content of water it will absorb. Any hulls contained in the flake will be thereby softened and loosened.

(2) The cleaned flake is then transferred to a stone grinder without loss of moisture, and is reduced by grinding to a finely divided state in which the particles vary in size from colloidal dimensions up to discrete particles. After the grinding is completed, the ground flake is converted to a slurry by adding water in sufficient quantity to bring the total water content up to approximately 8 times the dry flake content, by weight. More water is added to the slurry, as required, until it attains a substantially liquid state, with all of the bean solids in suspension, the slurry being subjected to some agitation to maintain the solids in suspension.

(3) The slurry is treated as by straining it through a woven fabric bag strainer while applying pressure thereto so as to abstract as much of the liquid and fine suspended solids as possible; or by centrifuging. Thus the pulp (oversize bean particles and any remaining particles of hull) is separated from the fine solids and dissolved proteins that are to be used, and the pulp is discarded.

(4) The dissolved proteins and fine solids are then precipitated from the retained strained liquor by treating the liquor with a precipitating agent such as calcium sulphate, calcium chloride, magnesium chloride, hydrochloric acid, citric acid or lactic acid, or lemon juice, or a mixture of some of these agents, and the mixture of liquor and precipitating agent is gently stirred until the resulting precipitate collects as a curd at the bottom of the vat. The liquid is then drawn off from the precipitate, and the curd is washed before being removed from the vat by filling the vat with fresh water which dissolves the excess precipitating agent and washes it away as it is drawn off from the vat, leaving the washed curd. A wire mesh basket is inserted into the vat on top of the curd to contain it as the wash water is largely removed by draining, siphoning, pumping or dipping. More water is then removed by pressure extraction through a strainer bag of fine fabric under a gentle pressure of about 1–4 ounces per square inch, applied over a period of about 15–30 minutes, until the drainage of excess liquid substantially stops. Much of the soy bean flavor is removed in the preceding steps. Remaining traces of this flavor are substantially removed in the following steps:

(5) The residue curd, after washing, is ground (e.g., in a stone grinder) and is mixed with water in a suitable freezing container to develop a fine milk-like suspension, the proportions, by weight, being approximately 15 parts curd and 85 parts water. This suspension is then frozen, at a temperature in the range of 20° F. over a period of about 6 hours. The water is frozen out of the suspension in the form of minute crystals, in a sponge-like structure. As freezing progresses, and the ice crystals coalesce and develop into a solid block of ice, the resulting expansion develops pressure which compacts and toughens the protein sponge structure sufficiently so that it will retain its fibrous characteristic during subsequent processing and handling.

The freezing step has the additional function of eliminating from the protein sponge residue, such carbohydrate content of the precipitate as has not been eliminated in the preceding steps (e.g., of washing). Such carbohydrate, being largely in solution, will be trapped in the ice crystals and thus separated from the protein fiber which develops between the ice crystals.

(6) The frozen material is then melted by subjecting the freezing container to heat (e.g., by immersion in hot water at a temperature of about 100° F. or by bathing the container in a jet of steam at a temperature of about 180° F.). Thus the ice crystals are reduced to water, which is removed by draining away the resulting melt. During this step the carbohydrates will remain dissolved in the water and separated from the protein material, which in the meantime has developed into solid fibers which do not readily absorb the water or the carbohydrate dissolved therein. We find that the soy taste is very substantially further attenuated during the freezing step and we attribute this result to the elimination of residual carbohydrates which appear to be carriers of the soy flavor.

(7) The protein fiber residue is then placed in a centrifuge and continuously bathed in a copious stream of water poured into the centrifuge and centrifuged off so as to continuously bathe the protein fiber with fresh water to effect removal of residual precipitate and to wash away the residual carbohydrate remaining in solution in the melted liquid clinging to the fibers.

(8) For soy milk production the washed fibrous material is then comminuted to a finely divided state. We have found that this is a difficult operation and cannot be satisfactorily effected by grinding. After many attempts with poor success we discovered that it can be satisfactorily accomplished by subjecting the fibrous material to the action of a high-speed rotary cutter known as a food disintegrator, and the process utilizes this means of reducing the sponge material to fine particles.

(9) During this comminuting step, the reconstituting of the protein material into milk is begun by adding to the material, selected additives including water, oil (e.g., cotton seed, peanut, corn or other equivalent oil) sugar, salt, calcium gluconate and ferrous sulphate. For a fortified milk, these additives may be supplemented by vitamins A, C and D. As these additives are poured into the disintegrator they are thoroughly mixed with the soy protein material by the rapidly rotating cutter. The disintegrator also functions to start homogenization.

(10) After the comminuting and additive-mixing step is completed, the mixture is homogenized in a piston-restricted orifice type homogenizer to produce a stable emulsion that will not separate. The resulting product is quite similar to natural milk and lacks any unpleasant soy taste.

(11) As a final step, the milk is refrigerated and packed in containers for shipment.

EXAMPLE II

Bean flake is processed, using steps (1–7) inclusive of Example I, and a food product (e.g., solid or semi-solid) other than milk, is prepared from the resultant fibrous material.

EXAMPLE III

Sesame seeds are converted into defatted flake, which is then processed in accordance with either of Examples I and II and a milk or other food product is thereby prepared.

EXAMPLE IV

Cotton seeds are converted into defatted flake, which is then processed in accordance with either of Examples I and II, and a milk or other food product is thereby prepared.

EXAMPLE V

Seeds of other legumes are converted into defatted flake, which is then processed in accordance with either of Examples I and II, and a milk or other food product is thereby prepared.

EXAMPLE VI

Alfalfa plant or other green plant material with substantial protein content is defatted, cleaned and soaked to substantially maximum water absorption; then processed in accordance with steps (2–7) of Example I; and the resultant fibrous material is then utilized in the preparation of a protein food product. Defatting is not required, since the fat content of the plant is low.

EXAMPLE VII (1) Selected raw soy beans, after first being cleaned, are moistened and sprouted at a temperature of 90° F.–100° F. over a time period of approximately 3 days to produce sprouts about ½–1½ inches length. The sprouting step is carried out by spreading the beans upon a screen or sheet of porous fabric in a layer of several beans depth. This layer of beans is sprinkled from above by a water spray at intervals of between 2 and 3 hours to maintain the beans adequately moist. In the spray, we avoid the use of water at a temperature much colder than the aforesaid sprouting temperature, so as to avoid arresting the sprouting action.

The sprouting step improves the vitamin content of the beans and also results in the hulls being loosened to a considerable extent, thereby facilitating the subsequent removal of the hull. A very substantial percentage of the hulls will drop off the beans during the sprouting step and the ensuing transfer of the beans to the next processing area. The sprouting step also modifies the taste of the beans so as to partially eliminate the disagreeable aspect of soy bean flavor.

(2) The sprouted beans, while still in the softened, moistened state, without substantial loss of absorbed water, are then washed in water to remove hulls and foreign material. Washing is preferably effected by agitating the beans in a vat of water and skimming off the hulls and other foreign matter from the surface of the water through overflow from the vat, after arresting the agitation.

(3) The diluted slurry is then cooked, in a pressure cooker or open vat, using as a heating medium live steam which is injected directly into the slurry in either case. In the pressure cooker, cooking is continued for 5 to 7 minutes. In open vat cooking, it is cooked for about 20 minutes. Cooking temperature in the pressure cooker is about 250° F. In the open vat it is about 215° F. In the cooking step, the oil and fatty acids are extracted from the slurry and are skimmed off the surface, so that the residue is defatted. This effects some further reduction of soy bean taste.

(4) Following the cooking step, the slurry is strained and further processed in accordance with steps 4 through 11 inclusive of Example I.

EXAMPLE VIII

The milk is prepared in accordance with Example I or II as to all steps thereof up to and including homogenization. The milk is then sealed in cans and is subsequently subjected to further pressure cooking.

EXAMPLE IX

Soy beans are cleaned and then treated to the sprouting step described in Example II, or defatted soy flake is moistened by soaking as in step (1) of Example I.

Following the sprouting or soaking step, the sprouted beans are transferred to a sodium hydroxide bath in which they are soaked for a period of approximately 4 hours. Hulls still clinging to the beans are further loosened in the hydroxide bath and will be removed in the ensuing washing steps. The hydroxide bath also functions to remove disagreeable aspects of the soy bean flavor, so that such flavor is not imparted to the slurry and the extract subsequently developed from the sprouted, soaked beans.

Following the hydroxide treatment, and without any substantial delay such as would tend to reduce the moisture content, the beans are subject to successive washing operations in successive baths of clear water, to remove the residual hydroxide from the beans and to remove hulls. In each washing bath, the beans are agitated to expedite the elimination of hydroxide and the removal of hulls. Agitation may be effected by tumbling in a rotating barrel or other container; or by hydrostatic means such as pressurized water jets directly upwardly through the beans within the washing bath container (e.g. by recirculating the water through a high pressure pump). During the washing stage, the hulls which remain associated with the beans are floated off through discharge from the washing container slightly below the surface of the bath therein. This can be accomplished by the aforesaid recirculation of water, with the discharging stream, laden with hulls, being passed through a filter or other means for separating the hulls from the recirculating stream. The level of discharge of the recirculating stream which carries away the hulls is preferably immediately below the level of the bath within the container. At the end of each washing step, the bath water is drained off to waste through a bottom outlet in the container. The washing step is repeated at least twice for a total of three washings, or more.

The beans are then subjected to a weak acid bath to neutralize the hydroxide residual in the beans. A weak hydrochloric acid solution is preferred, although other non-toxic acids, such as citric acid, can be utilized. The beans are soaked in the weak acid bath for approximately two hours so as to dissolve out and neutralize the residual hydroxide. There is further loosening and removal, in this acid bath, of any residual hulls not removed in the preceding treatment. Such hulls are floated away in the draining off of the acid bath at the end of the acid treatment, and in the further washing steps.

Following the neutralization step, the beans are subjected to further washing in two or more clear water baths to dissolve away and remove any acid that is residual in the beans. To a small extent, additional residual hull removal will take place in these washings.

The final washing liquor (e.g. of the second bath of the acid-removal series) is then tested for neutrality. If it is acid below a pH reading of 7, the beans will be subjected to one or more washing steps, with additional pH testings to the liquor at the end of each such further washing, until the residual liquor at the end of the last washing shows a reading of at least 7. If the last reading shows above 7.5, a very weak acid (e.g. hydrochloric or citric acid) is added to the washing liquor just sufficiently to bring the reading back to 7. Where it is necessary to utilize this correction step, the beans are left in the neutralized liquor long enough for the neutrality of the liquor to be transmitted to the beans.

The slurry is then further processed in accordance with step (3), and subsequent steps of Example I or II depending on whether the starting material is bean flake or raw beans.

We claim:
1. A process for the production of soy food products, including the following steps:
   producing a slurry of moistened, ground soy bean material;
   extracting from said slurry a suspension of fine solids and proteins thereof in water;
   treating said suspension to precipitate said fine solids and proteins in the form of a curd;
   separating said curd from its water of suspension;
   comminuting said curd;
   adding fresh water to the comminuted curd to develop a new suspension of the precipitate;
   freezing said new suspension so as to separate said precipitate and the water of suspension into a frozen body of protein fiber material and ice crystals respectively embodied in said frozen body;
   thawing said frozen body to convert said ice crystals to water and releasing the same from said protein body;
   and subsequently processing said protein body into a food product.

2. The process defined in claim 1, wherein said slurry is produced from defatted soy bean flake from which oil has been previously extracted.

3. The process defined in claim 2, wherein said subsequent processing includes the steps of
   comminuting said protein body into a finely divided state; and
   mixing additives with said finely divided protein material to produce milk.

4. The process defined in claim 1, wherein said slurry is produced from moistened, dehulled soy beans.

5. A process for the production of protein food products, including the following steps:

producing a slurry of moistened, ground protein-containing vegetable material selected from the group consisting of soy beans, sesame seed, cotton seed, alfalfa plants, and other protein-containing green plant material;

extracting from said slurry a suspension of fine solids and proteins thereof in water;

treating said suspension to precipitate said fine solids and proteins in the form of a curd;

separating said curd from its water of suspension;

comminuting said curd;

adding fresh water to the comminuted curd to develop a new suspension of the precipitate;

freezing said new suspension so as to separate said precipitate and the water of suspension into a frozen body of protein fiber material and ice crystals respectively embodied in said frozen body, traces of unpalatable taste content being trapped in said ice crystals;

thawing said frozen body to convert said ice crystals to water, releasing the same from said protein body, and thereby removing said traces of unpalatable taste content;

and subsequently processing said protein body into a food product.

6. The process defined in claim 5, utilizing sesame seed as said protein-containing vegetable material.

7. The process defined in claim 5, utilizing cotton seed as said protein-containing vegetable material.

8. The process defined in claim 5, utilizing alfalfa plant as said protein-containing vegetable material.

9. The process defined in claim 5, wherein said vegetable material is selected from the group consisting of soy beans, sesame seed, cotton seed and alfalfa plants.

10. The process defined in claim 5, wherein said comminuting step is performed by grinding.

References Cited

UNITED STATES PATENTS

| | | | |
|---|---|---|---|
| 2,377,853 | 6/1945 | Boyer et al. | 99—199 X |
| 2,881,159 | 4/1959 | Circle et al. | 99—98 X |
| 3,099,649 | 7/1963 | Kawamura et al. | 99—14 X |
| 3,399,997 | 9/1968 | Okumura et al. | 99—64 |

OTHER REFERENCES

Peanuts, Grass Yield Edible Protein, Chemical and Engineering News, 1959, 37 [42] (pp. 42–43).

Soybean Milk, United States Dept. of Agriculture, Northern Utilization Research and Development Division, Peoria, Ill., January 1961.

LIONEL M. SHAPIRO, Primary Examiner

D. M. NAFF, Primary Examiner

U.S. Cl. X.R.

99—17, 98; 260—123.5